United States Patent [19]

Baglin et al.

[11] 4,423,011

[45] Dec. 27, 1983

[54] SELECTIVE RECOVERY OF BASE METALS AND PRECIOUS METALS FROM ORES

[75] Inventors: Elizabeth G. Baglin; John M. Gomes, both of Reno, Nev.

[73] Assignee: The United States of America as represented by the Secretary of the Interior, Washington, D.C.

[21] Appl. No.: 435,535

[22] Filed: Oct. 20, 1982

[51] Int. Cl.³ .................. C01G 55/00; C01G 3/10; C01G 53/10; C01G 7/00
[52] U.S. Cl. ....................... 423/22; 423/38; 423/41; 423/150; 75/101 R; 75/121; 75/115; 75/118 R
[58] Field of Search .............. 423/22, 150, 41, 38; 75/101 R, 121, 115, 118 R

[56] References Cited

U.S. PATENT DOCUMENTS

| | | | |
|---|---|---|---|
| 3,293,027 | 12/1966 | Mackiw et al. | 75/101 R |
| 3,741,752 | 6/1973 | Evans | 423/150 |
| 4,188,362 | 2/1980 | Edwards et al. | 423/22 |
| 4,260,588 | 4/1981 | Piret et al. | 423/22 |
| 4,337,226 | 6/1982 | Peasley et al. | 75/101 R |

*Primary Examiner*—Earl C. Thomas
*Assistant Examiner*—Robert L. Stoll
*Attorney, Agent, or Firm*—William S. Brown; Donald A. Gardiner

[57] ABSTRACT

Metal values are recovered from ore concentrates by forming a sulfide matte, grinding the matte, leaching with sulfuric acid at elevated temperature to selectively extract nickel and iron, and leaching the residue with an acidic aqueous ferric or cupric salt to selectively extract copper. The residue contains a high concentration of platinum, palladium and gold.

7 Claims, No Drawings

SELECTIVE RECOVERY OF BASE METALS AND PRECIOUS METALS FROM ORES

This invention relates to recovery of base metals, particularly nickel, iron and copper, and precious metals, i.e., platinum group metals and gold, from sulfide ores or concentrates. U.S. Pat. No. 4,337,226, the disclosure of which is incorporated herein by reference, discloses recovery of these metals from sulfide ore concentrates by means of a process comprising (1) smelting with a flux to form a matte, (2) dry grinding the matte to a size suitable for leaching, (3) leaching, in a first stage, with sulfuric acid to selectively extract nickel and iron, and (4) leaching, in a second stage, the residue with a solution comprising sulfuric acid and sodium hypochlorite or hydrogen peroxide to extract copper and the precious metals.

It has now been found, according to the present invention, that the process of U.S. Pat. No. 4,337,226 may be still further improved by employing as leach solution in the second-stage leach an acidic aqueous solution of a ferric or cupric salt, by means of which copper is selectively extracted, with the precious metals remaining in the residue. Thus, copper, as well as nickel and iron values, are selectively extracted, thereby avoiding the necessity of subsequent separation of copper and precious metals.

Smelting of the concentrate is by conventional means comprising fusing in the presence of an amount of flux sufficient to lower the melting point of the mixture from 1600° to about 1300° C. The preferred flux consists of a combination of lime and fluorspar. Silica may also be added to aid in the separation of iron oxides into the slag. After melting, the charge is held in the molten state in an essentially oxygen-free atmosphere for approximately ½ hr. During this time the temperature is controlled to between 1,400° and 1,600° C., preferably between 1,500° and 1,550° C. After cooling, the matte is separated from the slag. More than 95 pct of the copper, nickel, and precious metals are recovered in the matte.

The matte is crushed to minus ¼-inch chunks and then ground in a ball mill to at least minus 35 mesh but preferably minus 200 mesh, smaller particles being leached more rapidly and completely. Care must be exercised during grinding to prevent overheating and decomposing the sulfides. Dry grinding of the matte is preferred but wet grinding is acceptable. Nickel removal is generally more complete if the matte is ground dry.

Recovery of the metal values is accomplished with two leaching stages. In the first stage, matte is leached to about 40° to 100° C., at atmospheric pressure and with 10 to 40 wt-pct, preferably about 20 wt-pct, $H_2SO_4$. Higher extraction of nickel and iron results when the temperature is between about 65° and 95° C. The reaction is essentially complete in 2 hours at 65°, but higher temperatures and a longer leaching period, e.g., about 4 hours, may be required for maximum extraction. The $H_2SO_4$ extracts more than 99 pct of the nickel and iron but none of the copper or precious metal values. Since the leach is selective, the separation of nickel and copper, which is a major problem with existing processes, is eliminated.

Iron may be removed from the pregnant liquor by standard procedures, such as precipitation with ammonia or jarosite formation after prior oxidation of ferrous ions to the ferric state. The nickel can then be recovered from solution by hydrogen reduction or electrowinning. Material and equipment costs for the first leaching stage are low, and the costly autoclave commonly used for matte leaching is unnecessary. The offgas is $H_2S$ with only traces of $SO_2$. The $H_2S$ can be used in a later stage of the process to precipitate copper, or can be converted by the Claus process to elemental sulfur which can be marketed.

X-ray diffraction of the residue from the first-stage leach has shown that the copper is present as djurleite, $Cu_{1.93}S$. The second leaching stage extracts more than 98 pct of the copper from the first-stage residue, the residue from the second stage being a high-grade precious metal concentrate. The second-stage procedure uses an oxidizing leachant, i.e., an acidic aqueous solution of ferric or cupric salts, that selectively oxidizes the djurleite. Selective oxidation makes copper extraction possible without coextraction of precious metals.

The preferred ferric and cupric salts are ferric chloride, ferric sulfate and cupric chloride. The acidic aqueous solution preferably consists of a solution of the corresponding acid, i.e., hydrochloric acid with chloride salts and sulfuric acid with sulfate salts.

When ferric salts are used as second-stage leachants, acid is employed in a concentration sufficient to adjust the pH to less than about 1.5, preferably about 1.0, whereby hydrolysis of iron is prevented. The quantity of ferric salt required to oxidize and extract the copper can be determined from the stoichiometry of the reaction:

$$Cu_2S + 4Fe^{3+} \rightarrow 2Cu^{2+} + 4Fe^{2+} + S°$$

The leaching is carried out at atmospheric pressure and a temperature of about 50° to 100° C. for a period of about ½ to 6 hours. Generally, copper extraction is essentially complete in about 4 hours at 70° C.

The copper can be precipitated from the pregnant liquor by sparging with $H_2S$ evolved during the first leaching stage. The CuS formed may be sent to a copper smelter for further processing. The copper can also be cemented from solution by adding metallic iron. In either case, the iron solution is oxidized and recycled to the leaching circuit. Alternately, the iron can be precipitated and discarded and the copper recovered by electrowinning. Another option entails separating the iron and copper by solvent extraction, recycling the iron solution and electrowinning the copper.

The residue from the second leaching stage contains more than 99 pct of the precious metals. Impurities include elemental sulfur, which can be removed by standard methods, and lead sulfate, which would not cause a problem in the precious metals refinery.

When cupric chloride in an acidic chloride solution is used as second-stage leaching agent, the cupric chloride reacts as follows:

$$Cu_2S + 2CuCl_2 \rightarrow 4CuCl + S°$$

Because the chloride concentration is maintained at a high level by addition of hydrochloric acid and chloride salt, cuprous chloride is prevented from precipitating due to the formation of the chloride complex, $CuCl_2^-$. Copper may be electrowon from the leaching liquor. Chlorine produced at the anode converts the cuprous ions in solution to cupric ions. The regenerated solution is recycled to the leaching vat.

It has also been found, as an alternative embodiment of the invention, that a high grade precious metal concentrate may be obtained by means of a combination of the first-stage and second-stage leaches as follows: the matte is initially leached with sulfuric acid or hydrochloric acid under conditions similar to the above-described first-stage leaching process. After nickel and iron dissolution is complete, and most of the H$_2$S has been removed, sufficient ferric or cupric salt is added to solubilize the copper. This combination of leaching steps is appropriate for use with low-grade ores where recovery of copper and nickel is economically unfeasible.

The process of the invention will be more specifically illustrated by the following examples.

EXAMPLE 1

A charge consisting of 1,500 grams of flotation concentrate, 110 grams of CaO, and 55 grams each of CaF$_2$ and SiO$_2$, was charged into a graphite crucible. A flow of argon gas was maintained over the top of the charge in order to exclude oxygen. The sample was heated in an induction furnace to 1,360° to 1,540° C. for approximately ½ hour and was then poured into a preheated conical graphite mold. After cooling, the matte separated cleanly from the slag. The matte weighed 278 grams and the slag 1,314 grams. One hundred twenty eight grams of material volatilized. The extraction of the copper, nickel, cobalt, platinum group metal, and gold values into the matte exceeded 95 pct. The analysis of the concentrate and resulting slag and matte are shown in the following table.

|  | Oz/ton | | | Wt-pct | | | |
| --- | --- | --- | --- | --- | --- | --- | --- |
|  | Pt | Pd | Au | Cu | Ni | Fe | S |
| Flotation concentrate | 3.67 | 8.13 | 0.55 | 1.4 | 2.1 | 10.6 | 7.2 |
| Matte | 15.15 | 41.47 | 2.66 | 7.5 | 10.5 | 53 | 31.5 |
| Slag | .16 | .36 | .02 | .1 | .1 | 1.2 | 1.0 |

The matte was broken up and dry ground to minus 200 mesh in a small ball mill.

First Leaching Stage

A 275-gram charge of the pulverized matte was mixed with 2,580 ml of 2.06 M H$_2$SO$_4$ in a 4-liter resin kettle. The leaching conditions were 4 hrs at 95° to 100° C. with continuous agitation. The mixture was cooled and filtered and the products were analyzed. The pregnant solution contained more than 99 pct of the nickel and iron and none of the copper. The solution analyzed in g/l: Ni, 12; Fe, 56; Cu, <0.001. Pt, Pd, and Au were not detected in the leach liquor. The 30 g of residue contained 66 wt-pct Cu, 1 wt-pct each Ni and Fe, 163 oz of Pt/ton, 380 oz of Pd/ton, and 23 oz of Au/ton.

Second Leaching Stage

A 5-gram sample of the residue from the first-stage leach was leached for 6 hrs with a 70° C. solution composed of 19.6 grams Fe$_2$(SO$_4$)$_3$ (stoichiometric quantity) in 600 ml of 0.15 molar H$_2$SO$_4$ (pH 1.0). More than 98 pct of the copper was dissolved. A solid material which consisted primarily of elemental sulfur and all of the platinum group metals and gold was obtained. No precious metals were detected in the pregnant liquor containing copper. The residue analyzed 617 oz of Pt/ton, 1,640 oz of Pd/ton, 102 oz of Au/ton, and 1.7 wt-pct Cu, 0.32 wt-pct Ni, and 0.06 pct Fe.

Similar results were obtained with a second stage leaching solution containing a stoichiometric amount of FeCl$_3$ in 0.15 molar HCl. Similar results were also obtained with a second-stage leaching solution containing 0.24 moles CuCl$_2$, 1 mole HCl and 4 moles NaCl per liter.

EXAMPLE 2

In a variation of the two-stage leaching process, 50 grams of matte were leached for 2 hrs with 470 ml of 2.06 M H$_2$SO$_4$ at 95° C. Fifty grams Fe$_2$(SO$_4$)$_3$ was added, and the leaching continued for 4 more hours. More than 99 pct of the Cu, Ni, and Fe were extracted. A residue containing more than 98 pct of the precious metals was obtained. The residue analyzed 1.1 pct Cu, 0.7 pct Ni, 1.2 pct Fe, 626 oz of Pt/ton, 1,445 oz of Pd/ton, and 90 oz of Au/ton, and was similar to the product obtained from the two-stage leaching operation.

Comparable results were obtained by leaching the matte first with 4.1 molar hydrochloric acid and then with 0.32 molar ferric chloride solution.

We claim:

1. A process for recovery of nickel, iron, copper, platinum, palladium and gold values from ore concentrates consisting essentially of:
   (a) smelting the concentrate with a flux to form a matte and slag,
   (b) grinding the matte to a particle size suitable for leaching,
   (c) leaching, in a first-stage leach, the ground matte with sulfuric acid of a concentration of about 10 to 40 wt-pct at a temperature of about 40° to 100° C. and atmospheric pressure to selectively extract nickel and iron values, and
   (d) leaching, in a second-stage leach, the residue from the first stage leach with a leach solution comprising an acidic aqueous solution of a ferric or cupric salt, said solution having a pH of less than about 1.5, at a temperature of about 50° to 100° C. and atmospheric pressure, to selectively extract copper values and provide a residue containing a high concentration of platinum, palladium and gold.

2. The process of claim 1 in which the ore is a Stillwater complex sulfide ore.

3. The process of claim 1 in which the second-stage leach solution comprises an acidic aqueous solution of ferric sulfate, ferric chloride or cupric chloride.

4. The process of claim 3 in which the second-stage leach solution is selected from the group consisting of ferric sulfate in sulfuric acid, ferric chloride in hydrochloric acid, and cupric chloride in hydrochloric acid.

5. The process of claims 3 or 4 in which the pH of the second-stage leach solution is about 1.0.

6. The process of claim 1 in which the first- and second-stage leaches are conducted in sequence without an intervening filtration.

7. The process of claim 1 in which the residue from the first-stage leach is separated from the pregnant leach solution by filtration prior to second-stage leaching.

* * * * *